US007920160B2

(12) United States Patent
Tamaru et al.

(10) Patent No.: US 7,920,160 B2
(45) Date of Patent: Apr. 5, 2011

(54) ELECTRONIC CONFERENCE ASSISTANCE METHOD, AND INFORMATION TERMINAL DEVICE IN ELECTRONIC CONFERENCE SYSTEM

(75) Inventors: Eriko Tamaru, Kanagawa (JP); Motoyuki Takaai, Kanagawa (JP); Yuichi Ueno, Kanagawa (JP); Hitoshi Abe, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1160 days.

(21) Appl. No.: 11/553,006

(22) Filed: Oct. 26, 2006

(65) Prior Publication Data
US 2007/0263826 A1 Nov. 15, 2007

(30) Foreign Application Priority Data
Apr. 11, 2006 (JP) ................................. 2006-108267

(51) Int. Cl.
*H04N 7/14* (2006.01)
(52) U.S. Cl. .................. 348/14.1; 348/14.08; 348/14.12
(58) Field of Classification Search .... 348/14.01–14.16; 370/260–261; 709/204; 715/753, 751, 755
See application file for complete search history.

(56) References Cited

U.S. PATENT DOCUMENTS
2004/0258222 A1* 12/2004 Kobrosly et al. .......... 379/93.21
2005/0093971 A1 5/2005 Ono et al.

FOREIGN PATENT DOCUMENTS
JP 2000200237 7/2000
JP 2004110268 4/2004
JP 2005124160 5/2005

* cited by examiner

*Primary Examiner* — Melur Ramakrishnaiah
(74) *Attorney, Agent, or Firm* — Gauthier & Connors LLP (57) ABSTRACT

There is provided an information terminal device in an electronic conference system, including a reception unit that receives information on a state of attendance of participants in a conference, who are present in a plurality of conference holding spaces; a disadvantageous degree calculation processor that calculates a disadvantageous degree indicating a degree of disadvantage which each participant has when participating in the conference, based on the received information; and a disadvantageous degree output processor that outputs the calculated disadvantageous degree.

7 Claims, 9 Drawing Sheets

ATTENDANCE STATE DATA

| IC CARD NO | IC CARD READER NO | STATUS | LAST UPDATE TIME AND DATE |
|---|---|---|---|
| 1234-56-78 | 1325-77-92 | ON | 2005/01/12 15:32:24 |
| | | | |

Fig. 4B

| IC CARD NO | USER ID |
|---|---|
| 1234-56-78 | 007 |
| | |

Fig. 4C

| IC CARD READER NO | AREA |
|---|---|
| 9876-56-21 | HEAD-QUARTER |
| 1325-77-92 | NAKAI |
| | |

Fig. 4D

| USER ID | ATTENDANCE NAME |
|---|---|
| 007 | ICHIRO TANAKA |
| | |

Fig. 4E

STATE OF ATTENDANCE OF EACH PARTICIPANT

"ICHIRO TANAKA" LOGGED IN FROM NAKAI AT 15:32:24 ON JANUARY 12

Fig. 5

| TIME AND DATE | COMMUNICATION LOSS RATE |
|---|---|
| 15:32:30 | 50% |
| 15:32:35 | 30% |
| 15:32:40 | 32% |
| 15:32:45 | 28% |
| 15:32:50 | 50% |
| | |
| | |

Fig. 6

| EVENT ID | EVENT NAME |
|---|---|
| 001 | CONNECT PORTABLE PHONE |
| 002 | DISCONNECT PORTABLE PHONE |
| 003 | RECEIVE MESSAGE FROM PORTABLE PHONE |
| 004 | RECEIVE MESSAGE FROM PAD |
| 005 | DISPLAY MESSAGE |
| | |
| | |
| | |

Fig. 7A

EVENT LOG (STATE OF ATTENDANCE OF EACH PARTICIPANT)

| EVENT NO | EVENT ID | TIME AND DATE INFORMATION | USER ID | ADDITIONAL INFORMATION |
|---|---|---|---|---|
| 00001 | 001 | 15:35:24 | 012 | (Position(GPS INFORMATION) ) |
| 00002 | 003 | 15:37:56 | 012 | (Object-ID) |
| 00003 | 005 | 15:38:05 | 005 | (Object-ID) |
| 00004 | 002 | 15:40:13 | 012 | nil |
| 00005 | | | | |
| | | | | |
| | | | | |
| | | | | |
| | | | | |

| USER | ATTRIBUTE 1 (REGION) | ATTRIBUTE 4 (STATE OF ATTENDANCE) | ATTRIBUTE 6 (SPEECH RESERVED STATE) |
|---|---|---|---|
| MR. A | VALUE :HOST<br>RANK :3 | VALUE :ATTEND<br>RANK :3 | VALUE:<br>RANK :3 |
| MR. B | VALUE :REGION B<br>RANK: 2 | VALUE :ATTEND<br>RANK :3 | VALUE :<br>RANK: 2 |
| MR. C | VALUE :PORTABLE PHONE<br>RANK :1 | VALUE :NOT ATTEND<br>RANK :1 | VALUE :<br>RANK :1 |
| ⋮ | ⋮ | ⋮ | ⋮ |

Fig. 10

ELECTRONIC CONFERENCE ASSISTANCE METHOD, AND INFORMATION TERMINAL DEVICE IN ELECTRONIC CONFERENCE SYSTEM

PRIORITY INFORMATION

This application claims priority from Japanese Patent Application No. 2006-108267, filed on Apr. 11, 2006, which is incorporated herein by reference in its entirety.

BACKGROUND (i) Technical Field

The present invention relates to an electronic conference assistance method and an information terminal device employed in an electronic conference system.

(ii) Related Art

Conventionally, there is available an electronic conference system which has a large-scale readable and writable touch panel display device. Generally, such a touch panel display device is placed so as to be viewed by all participants of the conference and written thereon. Use of the electronic conference system enables a conference of a style, for example, where the participants gather around the touch panel display device, rather than remain seated, to discuss an idea conceived during the conference while writing the idea and so forth on the touch panel display device. The content written on the panel display can be stored intact as a screen image. Also in view of enhancement of conference efficiency, an increasing number of companies are introducing such electronic conference systems.

Moreover, when such a system is employed, presence of all participants in the conference room where the touch panel display device is installed is not mandatory. That is, when another touch panel display device is installed in a conference room in another location and connected via a network to the electronic conference system in the main location, a remote conference can be realized. This allows a person in a remote location to participate in the conference.

Further, when a person who is supposed to participate in the conference but is away from the place where the conference is held as, for example, they are on a business trip connects their own personal computer (PC) to the electronic conference system, they can participate in the electronic conference from any desired place. Still further, when a portable phone is connected to the electronic conference system via a connection line, that person can participate in the conference through audio.

As described above, use of an electronic conference system can realize a conference of a style where participants can participate in a variety of manners, not limited to a conventional general conference style in which participants are kept seated and discuss ideas.

Here, when a remote conference is taking place by connecting the device in the main location to the device used by a conference participant in another location to via a network, basically, data of images captured using a camera or the like in the conference room, in particular data of an image of a person who speaks, is transmitted to other locations. With this arrangement, a participant in the remote location can talk to the person speaking while looking at their image being shown.

Moreover, a moderator who presides over the conference can check a participant in a conference by looking at the images captured in the respective locations when discussion is carried out between distant locations, and ask the checked participant to present their opinion or encourage them to speak.

SUMMARY

According to one aspect of the present invention, there is provided an information terminal device in an electronic conference system, including a reception unit that receives information on a state of attendance of participants in a conference, who are present in a plurality of conference holding spaces; a disadvantageous degree calculation processor that calculates a disadvantageous degree indicating a degree of disadvantage which each participant has when participating in the conference, based on the received information; and a disadvantageous degree output processor that outputs the calculated disadvantageous degree.

BRIEF DESCRIPTION OF THE DRAWINGS

An exemplary embodiment of the present invention will be described in detail based on the following figures, wherein.

DETAILED DESCRIPTION

In the following, an exemplary embodiment of the present invention will be described while referring to the accompanied drawings.

Figure 1:
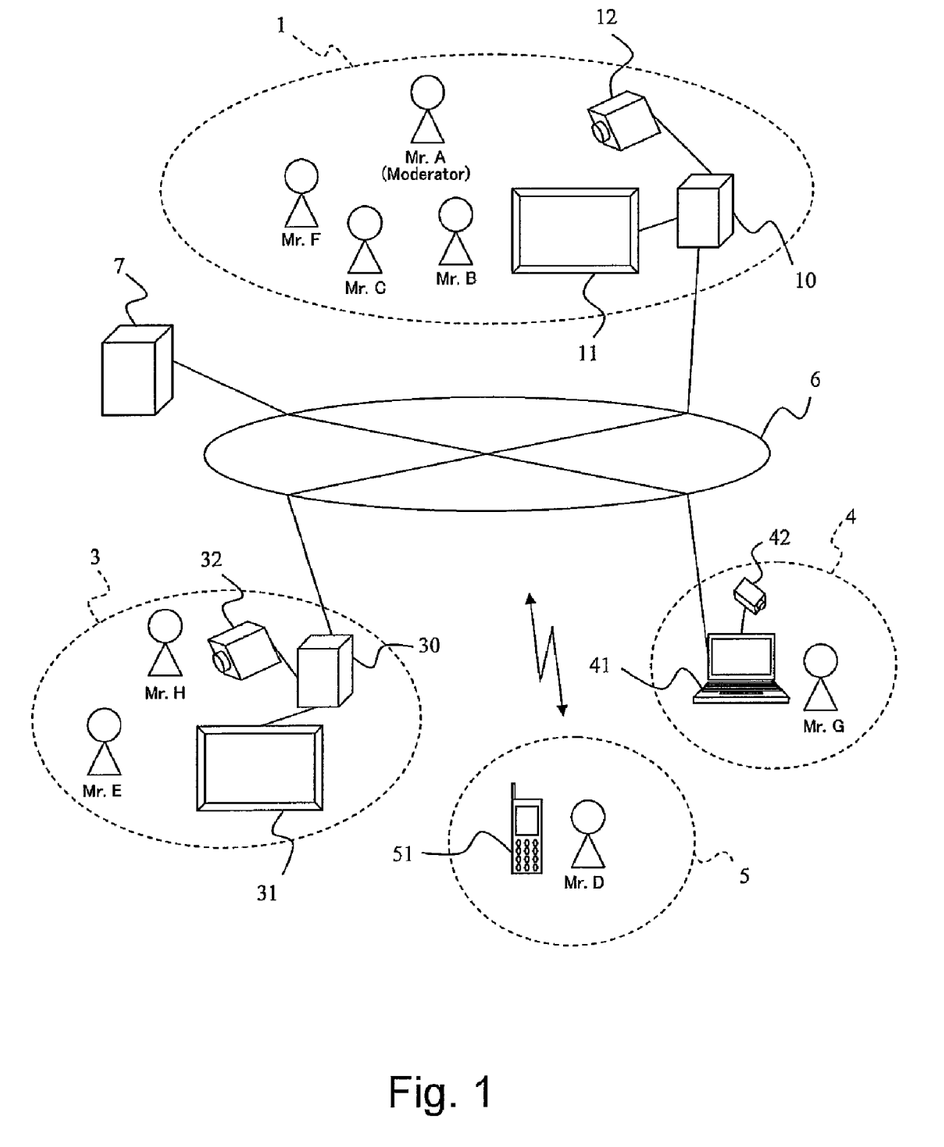
FIG. 1 is a diagram schematically showing an overall structure of an exemplary embodiment of a remote conference which is carried out by utilizing one exemplary embodiment of an electronic conference system according to the present invention.

FIG. 1 is a diagram schematically showing an overall structure of an exemplary embodiment of a remote conference which is carried out by utilizing one exemplary embodiment of an electronic conference system according to the present invention. In FIG. 1, a structure is conceptually shown in which a conference room 1 constituting a main conference location, a conference room 3 in another location, a personal office 4 such as a home, satellite office, or the like, of a conference member, and a place other than any of the above (hereinafter referred to "an outside place" 5) are connected to one another via a network 6. Although a conference room generally constitutes a conference holding space where an electronic conference takes place, any place, such as an outside place 5, can constitute a conference holding space when an information device used by a conference member there is connected to the electronic conference system via the network 6. In this exemplary embodiment, the conference room 1 where a moderator is present to preside over the conference is considered as a main conference room.

In the main conference room 1, a conference server 10, a touch panel display device 11, and a camera 12 are installed. The touch panel display device 11 is placed so that it can be viewed from any place in the conference room, and a conference participant can write on the touch panel display device 11. The camera 12 is a device for capturing an image in the conference room 1. The conference server 10, to which the touch panel display device 11 and the camera 12 are connected, controls the conference taking place in the conference room 1 while controlling display by the touch panel display device 11 according to the input from the respective devices 11, 12, and moreover, conducts overall control of the electronic conference taking place using the system.

In the conference room 3 in another location, a conference server 30, a touch panel display device 31, and a camera 32 are installed. The devices in the conference room 3 may basically be identical to those in the conference room 1. However, the conference server 30 is not allowed to conduct overall control of the conference due to the absence of a moderator.

Here, "another location" generally refers to a remote place in this exemplary embodiment. However, strictly speaking, "another location" need not necessarily be a remote location but may be any conference room different from the main conference room 1. Thus, the conference room 2 may be located in the same building as the building where the conference room 1 is located. Moreover, the conference servers 10, 30 are not necessarily installed on the inside of the conference rooms 1, 3, respectively, as long as these are connected to the servers in other locations and touch panel display devices or the like in the conference rooms, which are a part of the electronic conference system, so as to be able to control the conferences held in the respective conference rooms 1, 3.

In the personal office 4, an information terminal device 41 and a camera 42 are installed. The camera 42 captures an image of the conference member. The information terminal device 41 is realized using a personal computer (PC) having an electronic conference assistance program installed therein for utilizing the electronic conference system according to this exemplary embodiment, and carries out data communication with the conference server 10. In an outside place 5, a portable phone 51 used by a conference member is available.

The information management server 7 stores and manages a variety of information or the like which is necessary in an electronic conference utilizing the electronic conference system, including information on a user who is a conference member, information on a conference group constituted by the users, reference information for use in a conference, and so forth. In actual fact, the storage and management of such information is realized using plural servers depending on the purpose and use of such information, though only a single server is shown here for convenience as management of information used in the electric conference system is not the gist of this exemplary embodiment.

Figure 2:
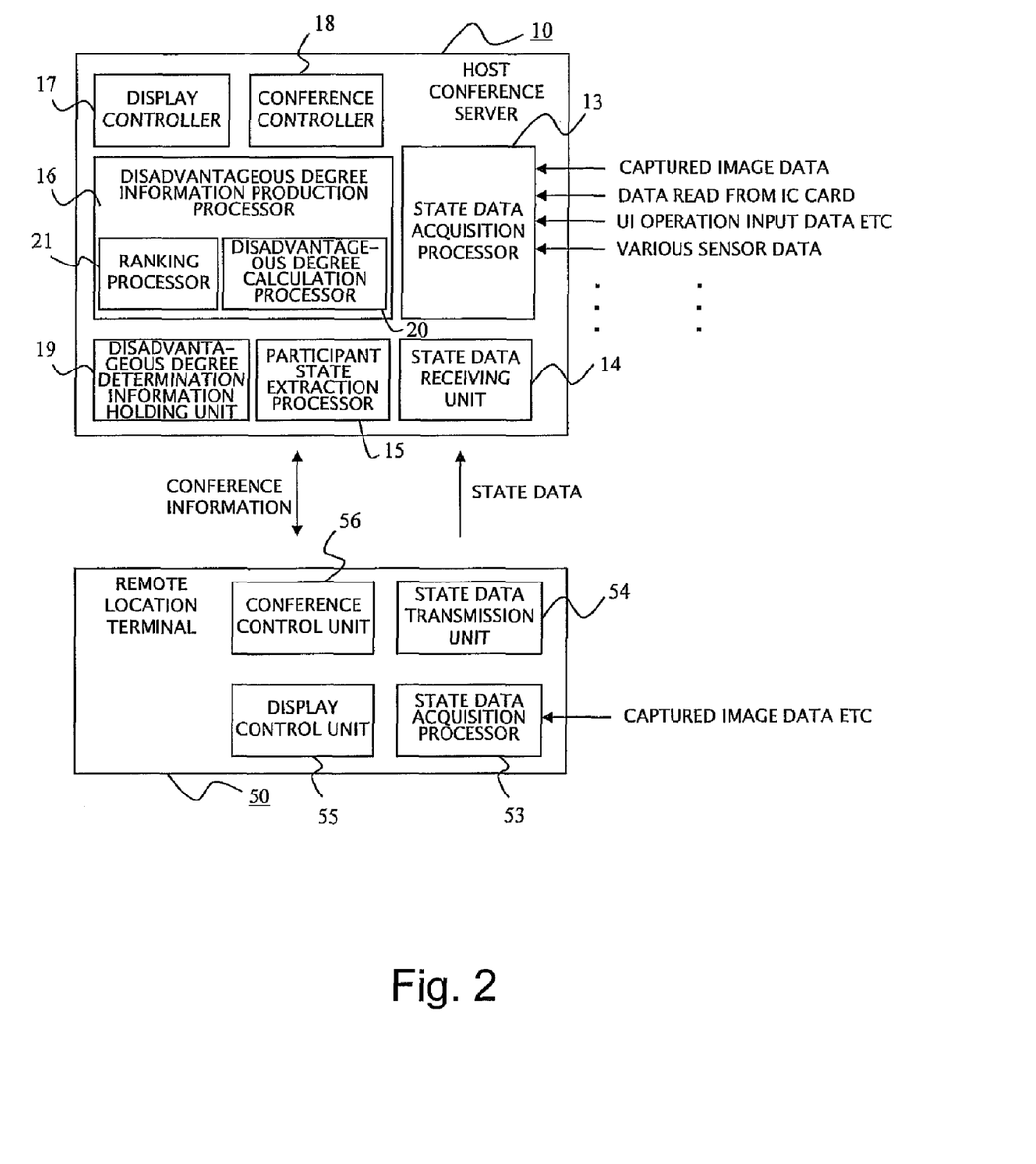
FIG. 2 is a block diagram showing a structure of the electronic conference system according to this exemplary embodiment.

FIG. 2 is a block diagram showing a structure of an electronic conference system in this exemplary embodiment. The host conference server 10 shown in FIG. 2 is a server computer which corresponds to the conference server 10 installed in the conference room 1, shown in FIG. 1, where the moderator is available. The remote location terminal 50 is an information terminal device installed in each conference holding space other than the conference room 1, and corresponds to the conference server 30, the information terminal device 41, and the portable phone 51 shown in FIG. 1.

As for the conference server 30, the information terminal device 41, and the portable phone 51, the states of connections of the units mounted respectively thereto for collecting data on the state of attendance may differ depending on the scales of the devices and circumstance in which the devices are used. Meanwhile, the conference server 30, the information terminal device 41, and the portable phone 51 are common in that all have an electronic conference assistance program installed therein for carrying out a process and an operation to be described later. In the following, based on the arrangement in which the process function commonly available by the conference server 30, the information terminal device 41, and the portable phone 51 is possessed by the remote location terminal 50, only a single remote location terminal 50 is shown in FIG. 2.

The host conference server 10 has a state data acquisition processor 13, a state data receiving unit 14, a participant state extraction processor 15, a disadvantageous degree information production processor 16, a display controller 17, a conference controller 18, and a disadvantageous degree determination information holding unit 19. The state data acquisition processor 13 collects attendance state data, which is input from various devices connected to the host conference server 10. In short, the attendance state data is data which could serve as an index to help comprehension of the state of attendance of each participant in a conference, with a detailed description of the attendance state data to be followed.

Like the state data acquisition processor 13 which collects the attendance state data to ascertain the state of attendance of the participant in the conference room 1, the remote location terminal 50 collects the attendance state data to ascertain the state of attendance of the participant in the conference held in that remote location. The state data receiving unit 14 receives the attendance state data collected by the remote location terminal 50. The participant state extraction processor 15 analyzes the attendance state data collected by the state data acquisition processor 13 and the state data receiving unit 14 to thereby extract information on the state of attendance of each participant in the conference from the attendance state data.

The disadvantageous degree information production processor 16, while referring to a calculation expression and a reference value set in the disadvantageous degree determination information holding unit 19, analyzes the extracted information on the state of attendance of each participant in the conference to thereby obtain a disadvantageous degree of that participant, and produces visible display information based on the disadvantageous degree determined. The disadvantageous degree calculation processor 20 contained in the disadvantageous degree information production processor 16 calculates a disadvantageous degree indicative of the degree of disadvantage which each participant suffers when participating in the conference. The ranking processor 21 ranks the respective participants by allocating the disadvantageous degree of each participant calculated by the disadvantageous degree calculation processor 20 based on the predetermined reference value.

The display controller 17 basically controls display by the touch panel display device 11, and in particular in this exemplary embodiment, controls display of the information on the disadvantageous degree produced by the disadvantageous degree information production processor 16.

The conference controller 18 controls the operation of the respective structural elements 13 through 17 described above to thereby carry out the control by the host conference server 10, and, moreover, conducts overall control of the conference in cooperation with the conference controller of the remote location terminal 50.

The disadvantageous degree determination information holding unit 19 holds information, such as a calculation expression, a ranking reference value for use in ranking, or the like, which is necessary for calculation and display of a disadvantageous degree or the like. The information held in the disadvantageous degree determination information holding unit 19 can be updated using a unit, not shown.

The process functions of the above-described respective units 13 through 18 of the host conference server 10 are realized in cooperation with the computer constituting the host conference server 10 and the electronic conference assistance program executed by a CPU mounted to the computer. It is assumed here that the disadvantageous degree determination information holding unit 19 is realized using an external memory device, such as a HDD or the like. Obviously, the disadvantageous degree determination information holding unit 19 is not necessarily mounted in the host conference server 10, but may be mounted in a computer which is accessible via a network, so that necessary information is read and written, as required, with respect to the disadvantageous degree determination information holding unit 19.

Meanwhile, the remote location terminal 50 comprises a state data acquisition processor 53, a state data transmission unit 54, a display controller 55, and a conference controller 56. The state data acquisition processor 53 collects attendance state data input from various devices connected to the remote location terminal 50. The state data transmission unit 54 sends the attendance state data collected by the state data acquisition processor 53 to the host conference server 10. The remote location terminal 50 downloads the screen image shown in the touch panel display device 11 from the host conference server 10 and displays in the display unit in that remote location. With this arrangement, the participant in that remote location can look at the same screen image as is shown in the host conference room, while participating in the conference. The display controller 17 controls display of the downloaded screen image. Specifically, the display controller 17 controls display by the touch panel display device 11 in the case where the remote location terminal 50 is the conference server 30, and display by the PC in the case where the remote location terminal 50 is the information terminal device 41.

As for a portable phone 51, display control is carried out such that a still image shown in the display unit thereof is periodically changed, because real time display at the same level as is achieved with the touch panel display device 11 is practically not readily achievable. The conference controller 56 controls operations of the above-described structural elements 53 through 55, whereby control of a conference by the remote location terminal 50 is carried out.

In this exemplary embodiment, in operation, data which is held in the units other than the disadvantageous degree determination information holding unit 19, such as in the management server 7, may be accessed as required. These data will be described later in the description on the operation.

It should be noted that "an electronic conference system" as used in this specification collectively refers to a system which is used when carrying out a conference taking place by utilizing an information terminal device, such as conference servers 10, 30, the information terminal device 41, and so forth, which is equipped with a computer and a network function. This exemplary embodiment is preferably realized by installing a process function to be described later into the Interactive Wall (registered trademark) which is manufactured by and commercially available from Fuji Xerox, Co., Ltd, as an electronic conference system.

In the following, an operation in this exemplary embodiment will be described. Specifically, a basic flow of a conference taking place utilizing the electronic conference system is initially described, and followed by a description of an operation relevant to the disadvantageous degree which is characteristic in this exemplary embodiment.

Initially, a basic flow of the conference will be described. Respective users who are scheduled to participate in a conference initially have their own IC cards read by an IC card reader (not shown) to thereby log in to the electronic conference system to register themselves as members to participate in the conference. With the above, information on the conference to take place, including information on the individual user, information on a conference group to which the user belongs, information on the conference room, or the like, is updated.

When the conference begins, the moderator presides over the conference while utilizing the host conference server 10. The screen image shown in the touch panel display device 11 of the host conference server 10 is shown in the respective display units of the remote location terminals 50 in cooperation with the conference controllers 18, 56. When the screen image shown in the touch panel display device 11 is changed, the screen images shown in the respective display units of the remote location terminals 50 are updated on a real time basis to show the changed screen image.

The screen image shown in the touch panel display device 11 may be of conference information data prepared by the presenter and/or image data captured using the camera 12. The image data to be displayed may be displayed in a switching manner in the touch panel display device 11. Alternatively, many images may be concurrently shown by means of screen division. The audio of a speech by a participant is collected by a microphone installed in each location and output via the speaker. This makes it possible to carry out conversation between distant locations.

In the above-described manner, images and audio can be commonly utilized by the respective locations, so that a remote conference can be realized. Obviously, it should be noted that as for a user in a conference holding space, such as an outside place, where no device for distributing a moving image is available or only audio is accessible, the user there participates in the conference under such circumstances.

The above outlined is a basic flow of an electronic conference. An operation of the electronic conference system for realizing a conference such as is described above can be realized by use of a conventionally available function.

In the following, a characteristic process for calculating and displaying a disadvantageous degree of each participant in this exemplary embodiment will be described.

It should be noted that "a disadvantageous degree" as is referred to in this exemplary embodiment can be considered as followed. That is, respective users participating in a conference may not all participate in the conference under the same circumstances. That is, as described above, some may be in a conference room, being able to look at the display in the touch panel display device, while others may be in an outside place, participating in the conference through audio only. In short, the conditions under which the respective users participate in the conference may differ from one another.

In the above described example, it can be said that, in view of a manner in which to participate in a conference, a user participating in the conference through audio only from an outside place by utilizing a portable phone participates in the conference under inferior condition compared to a user in the conference room 1. That is, it can be said that the user is in a disadvantageous condition.

In this exemplary embodiment, numerical data of an index indicative of the degree of disadvantage which each participant suffers when participating in the conference is referred to as "a disadvantageous degree". That is, the disadvantageous degree of a user participating in a conference from an outside place tends to be larger compared to a user in the conference room 1.

In this exemplary embodiment, in principle, a disadvantageous degree is calculated for each participant. In calculation of a disadvantageous degree by the host conference server 10, data (that is, the above-described attendance state data) which is input from various devices is used as original data. Examples of the attendance state data used in this exemplary embodiment will be described below.

"Data Read by Touch Method IC Card Reader"

This is the data collected by an IC card reader by reading an IC card of each conference participant. That is, individual ID information, including a user ID or the like is recorded in an IC card, and when and who participates in a conference at what location can be ascertained from the read data. When an IC card reader is provided in each seat, even the seat position of each user can be ascertained depending on which IC card reader is touched.

"Data Read by Wireless Method IC Card Reader"

This is the data collected by an IC card reader (receiver) by receiving information actively pushed by an IC card. Based on the data received by the receiver, when and who is at what position in a conference room in which location can be ascertained.

"Data Collected by Various Sensors"

Data read by various sensors is basically the data for helping in recognition of a user's location, similar to the data obtained using a wireless method IC card reader described above. For example, a user ID and a user's current position can be ascertained based on the data obtained by an optical detection sensor by detecting a light emitter such as an LED or the like mounted to an IC card. Further, based on the data obtained by detecting the light emitter such as an LED or the like mounted to equipment such as a touch panel display device 11, a table, or the like, a distance between each conference participant and the equipment can be ascertained. Still further, a noise level in the conference holding space can be ascertained by using a noise sensor or the like.

"Image Data Captured Using a Camera"

This is image data obtained using a camera by capturing an image in the conference holding space. When the captured image data is subjected to face recognition processing, it is possible to ascertain who is in a conference holding space such as a conference room or the like.

"Communication State Data"

This is data collected by a network interface unit (not shown) by monitoring the network. Based on the data, it is possible to ascertain the state of occurrence of audio loss, the state of data communication, and so forth, that is, how correctly the information is conveyed to the communication destination.

"User Input Data Relative to Server or the Like"

This is data which is input through an operation button pressing operation, a writing operation, a mail transmission operation, and so forth. As a user action can be specified based on the input data, it is possible to ascertain the user's intention based on the input data.

The information acquiring processors 13, 53 acquire at least one or more of the data on the above-described information. In calculation of a disadvantageous degree, all of these data items are not necessarily needed, though it is believed that the larger number of data types used in the calculation results in higher accuracy of a calculation result.

Which of the output sources of attendance state data, such as a camera, an IC card reader, or the like, is used is determined depending on the structures of the host conference server 10 and/or the remote location terminal 50. In this exemplary embodiment, collectable data is used as attendance state data in calculation of a disadvantageous degree.

Figure 3:
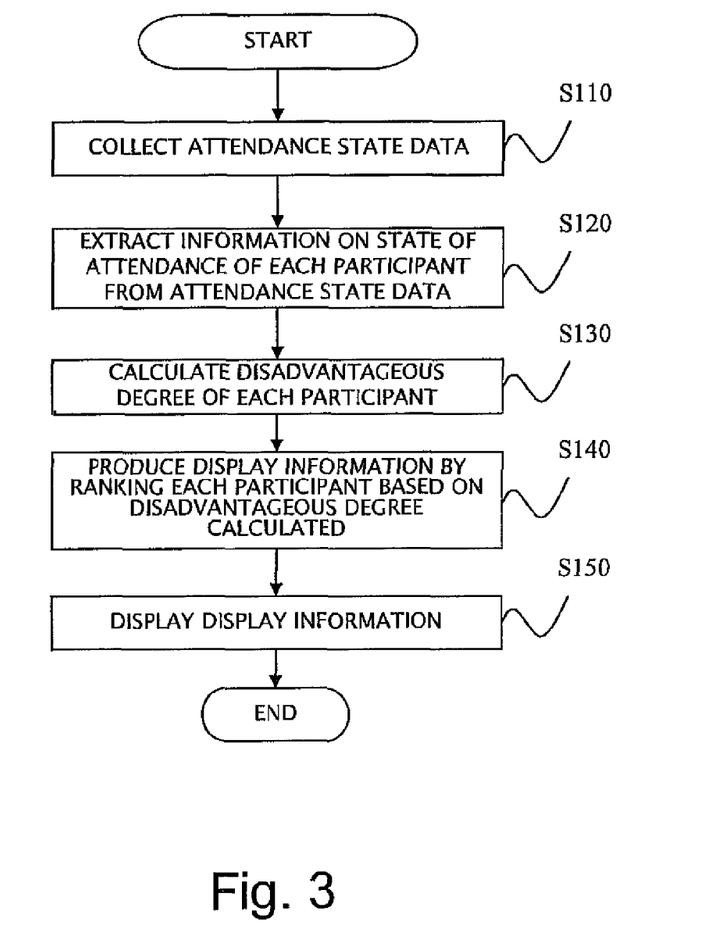
FIG. 3 is a flowchart showing a process carried out by a host conference server to calculate and display a disadvantageous degree in this exemplary embodiment.

In the following, a process carried out by the host conference server 10 to calculate and display a disadvantageous degree in this exemplary embodiment is described while referring to the flowchart shown in FIG. 3.

In step 110, the state data acquisition processor 13 collects attendance state data in order to grasp the state of attendance of the participant in the conference held in the conference room 1 from the camera 12, the IC card reader (not shown), or the like. The kind of data to be collected is such as is described above.

Similarly, in the remote location terminal 50, the state data acquisition processor 53 collects attendance state data from the camera 12 connected thereto in order to ascertain the state of attendance of the participant in the conference held in the remote location. The state data transmission unit 54 sends the collected data to the host conference server 10. The state data receiving unit 14 receives the attendance state data sent from the respective remote location terminals 50.

In step 120, the participant state extraction processor 15 analyzes the attendance state data collected by the state data acquisition processor 13 and the state data receiving unit 14 to thereby extract information on the state of attendance of the participant in the conference.

Here, some examples of the attendance state data collected by the state data acquisition processor 13 and the state data receiving unit 14, and of the information on the state of attendance of each participant, which is obtained based on the attendance state data, are described.

Figure 4A:
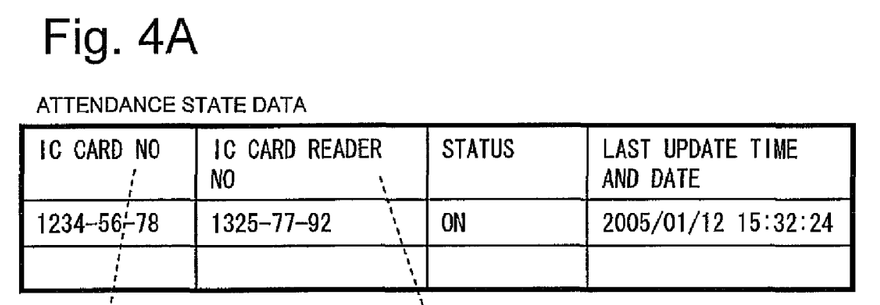
FIG. 4A is a conceptual diagram showing relationship of data which is utilized during a process until information on the state of attendance is extracted from the data read from an IC card and sent from an IC card reader in this exemplary embodiment, and particularly showing the attendance state data.

FIG. 4A is a diagram showing an exemplary structure of attendance state data sent from the IC card reader. The attendance state data is formed containing an ID code number of an IC card read, an ID code number of the IC card reader which reads the IC card, the state of the IC card reader, and the latest time and date when the IC card reads the IC card, all recorded so as to be associated with one another.

Figure 4B:
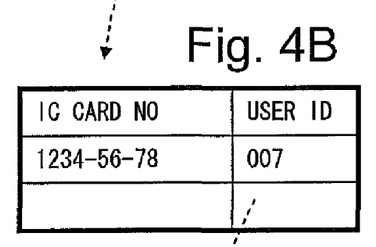
FIG. 4B is a conceptual diagram showing relationship of data which is utilized during a process until information on the state of attendance is extracted from the data read from an IC card and sent from an IC card reader in this exemplary embodiment, and particularly showing a part of information on a user.
Figure 4C:
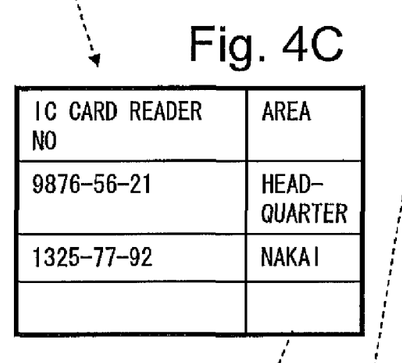
FIG. 4C is a conceptual diagram showing relationship of data which is utilized during a process until information on the state of attendance is extracted from the data read from an IC card and sent from an IC card reader in this exemplary embodiment, and particularly showing a part of information on conference equipment.
Figure 4D:
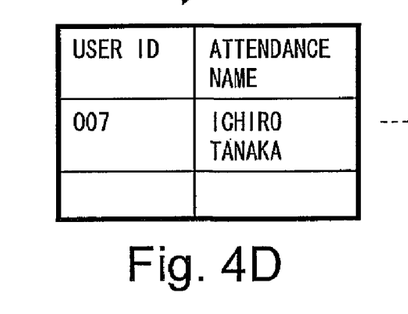
FIG. 4D is a conceptual diagram showing relationship of data which is utilized during a process until information on the state of attendance is extracted from the data read from an IC card and sent from an IC card reader in this exemplary embodiment, and particularly showing another part of the information on the user.

FIG. 4B is a diagram showing a part of the user information in which the ID code of an IC card of each user and the user ID of that user are associated with each other. FIG. 4C is a diagram showing a part of the information on conference equipment in which the ID code of an IC card reader and a place where the IC card reader is installed are associated with each other. FIG. 4D is a diagram showing a part of the user information in which the user ID of each user and the name of that user are associated with each other. The above-described information is registered in the information management server 7.

Figure 4E:
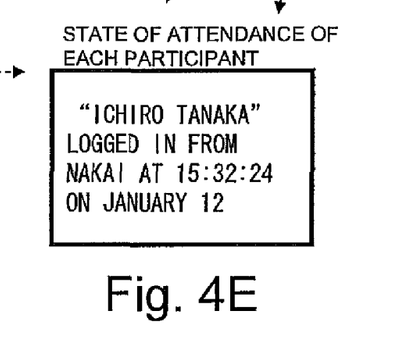
FIG. 4E is a conceptual diagram showing relationship of data which is utilized during a process until information on the state of attendance is extracted from the data read from an IC card and sent from an IC card reader in this exemplary embodiment, and particularly showing the extracted state of attendance.

The participant state extraction processor 15, while referring to the information registered in the information management server 7, extracts information on the state of a participant, which can be specified based on the collected attendance state data. In this example, as shown in FIG. 4E, information describing the state of attendance that is "Ichiro Tanaka" in Nakai logged in at 15:32:24 on January 12 can be extracted.

Figure 5:
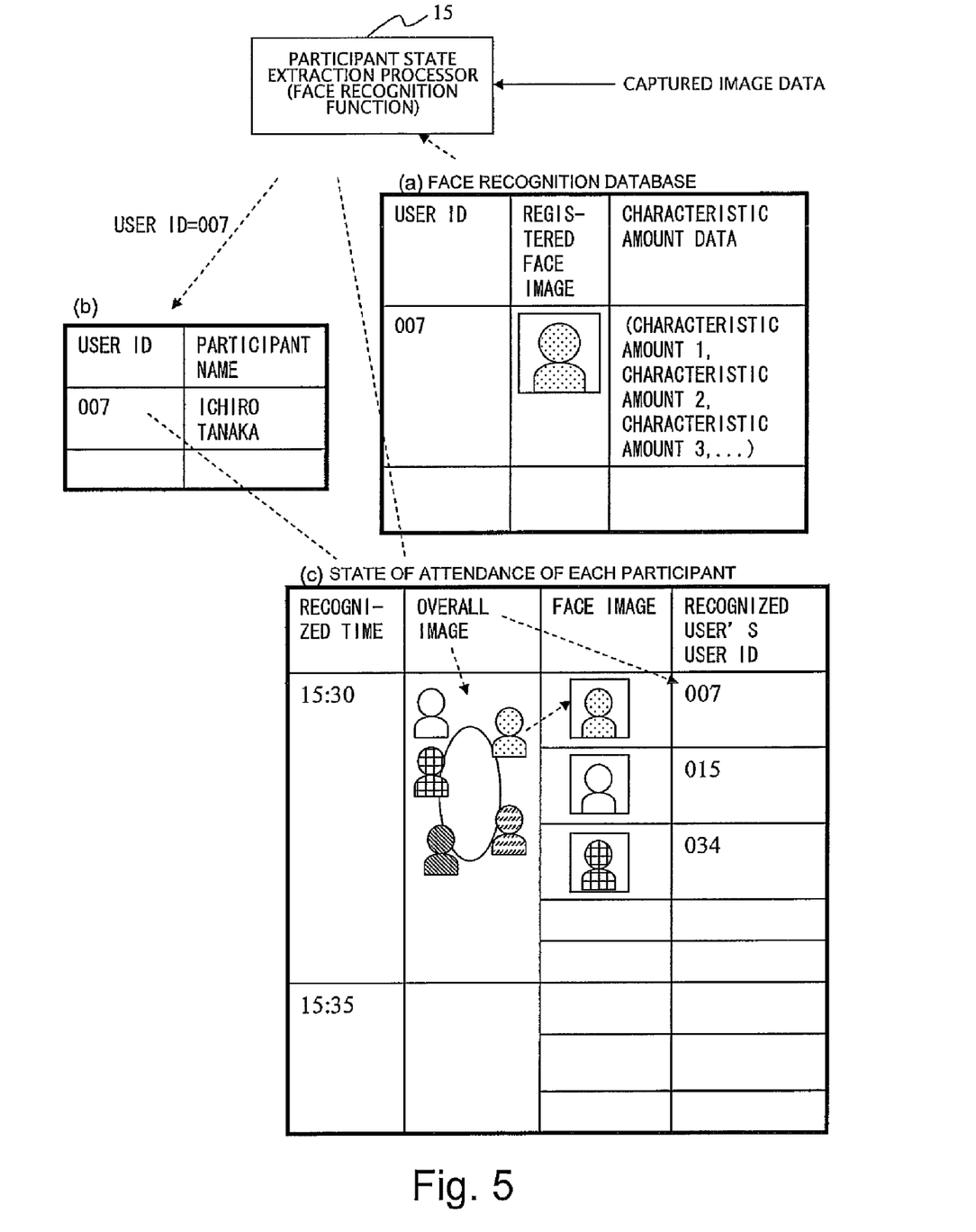
FIG. 5 is a conceptual diagram showing relationship of data which is utilized during a process until information on the state of attendance is extracted from the captured image data sent from a camera in this exemplary embodiment.

FIG. 5 is a conceptual diagram showing an example in which information on the state of attendance is extracted from the image data captured using the camera 12. The participant state extraction processor 15 has a face recognition function for extracting a face image of a participant whose image has been captured, by analyzing the captured image data.

FIG. 5 shows an exemplary data structure of a face recognition database in which a user's face image and characteristic amount data are recorded so as to be associated with the user's user ID. The face recognition database is prepared in the information management server 7. The information on the user shown in FIG. 5 has the same content as that which is shown in FIG. 4D.

The participant state extraction processor 15 analyzes the captured image data while referring to the face recognition database to thereby specify the participant whose image has been captured. In addition, the position of each participant in the conference room 1 is concurrently specified. As described above, by analyzing the captured image data, it is possible to extract information on the state of attendance such as who is in the conference room 1 and which participant is in which position.

Figure 6:
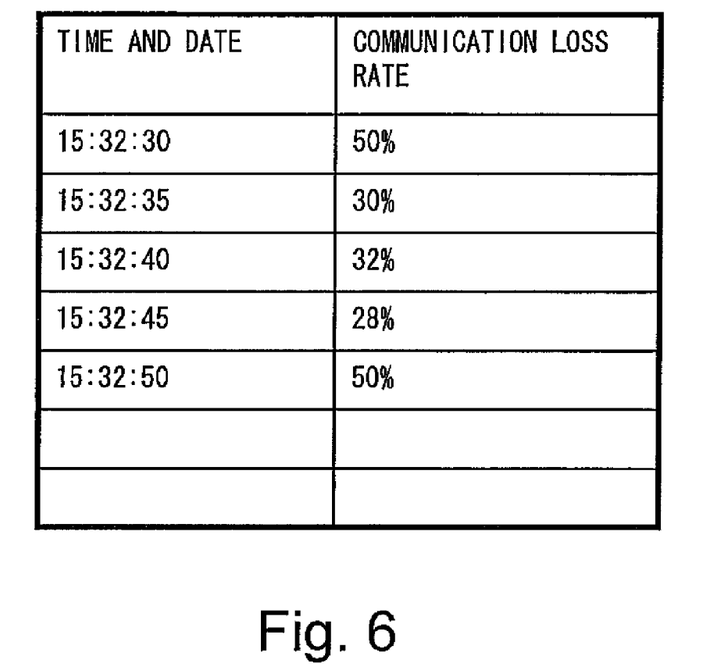
FIG. 6 is a conceptual diagram showing relationship of data which is utilized during a process until information on the state of attendance is extracted from an event occurring in the system in this exemplary embodiment.

FIG. 6 is a diagram showing an exemplary data structure of the information on a communication state which is collected by monitoring the communication state of the network. Information on the communication state is formed containing a monitoring time and date and a communication loss rate at that time, both being associated with each other.

The participant state extraction processor 15, while referring to the information on the communication state collected by the state data acquisition processor 13, can ascertain the quality of communication with each of the respective remote locations. That is, information on the state of attendance of each participant in a remote location in view of the state of communication can be extracted.

For example, for a participant in a remote location with a larger communication loss rate, the disadvantageous degree of the participant is believed to be relatively large due to the relatively inferior communication quality. Meanwhile, for a participant in a remote location with a smaller communication loss rate, the disadvantageous degree of the participant is believed to be relatively smaller due to the relatively superior communication quality thereof.

Figure 7A:
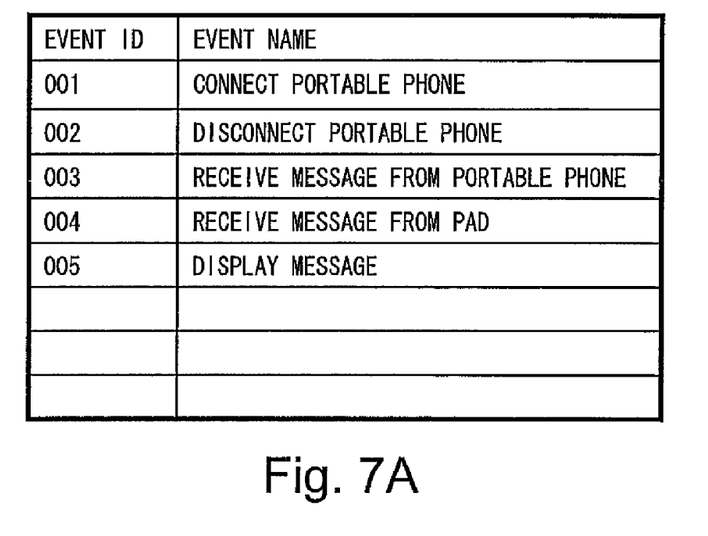
FIG. 7A is a conceptual diagram showing relationship of data which is utilized during a process until information on the state of attendance is extracted from a user action in this exemplary embodiment, and particularly showing information on the event.
Figure 7B:
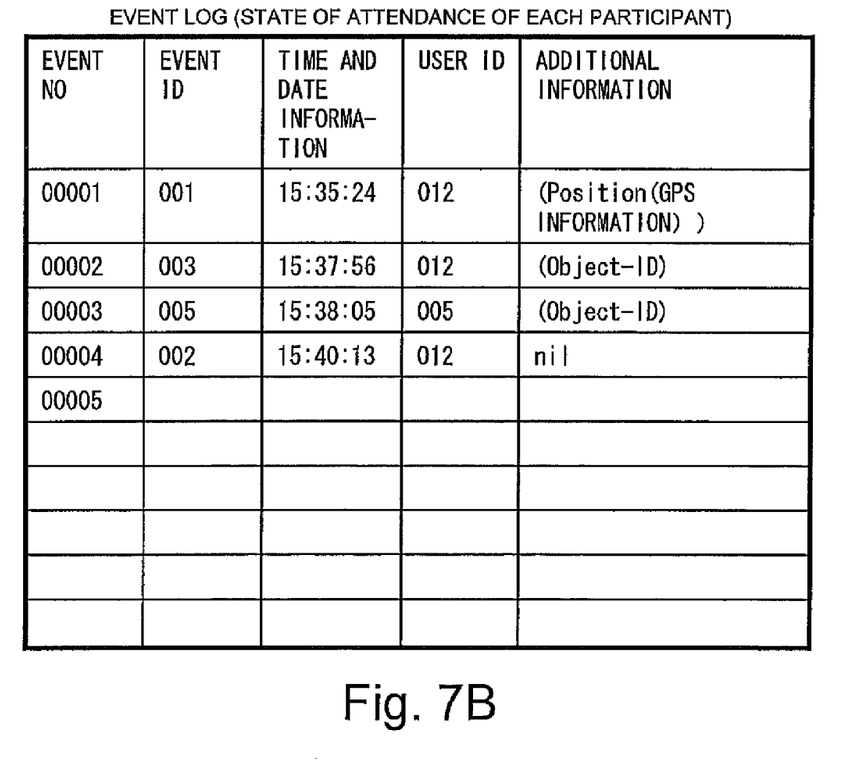
FIG. 7B is a conceptual diagram showing relationship of data which is utilized during a process until information on the state of attendance is extracted from a user action in this exemplary embodiment, and particularly showing an event log.

FIGS. 7A and 7B is a diagram explaining an example in which information on the state of attendance of a participant is obtained based on a user action.

Specifically, the participant state extraction processor 15 collects data on a writing operation relative to the touch panel display device 11 and input operation using an input unit, which are collected by the state data acquisition processor 13, or data on the state of line connection with an external information device and a user's input operation carried out in the remote location terminal 50 after the connection is established, which are collected by the state data receiving unit 14. Then, the participant state extraction processor 15 analyzes the collected data to thereby specify the event caused.

FIG. 7A is a diagram showing an exemplary data structure of information on an event in which the event ID and the name of the event caused through a user's operation are made associated with each other. This event-related information is registered in the information management server 7. Upon receipt of a user action input, the participant state extraction processor 15 compares and checks the event ID which specifies the user action input and the information on the event to thereby specify the user action, and records the specified user action as event log information. As described above, by analyzing a user action, it is possible to know what type of action the conference participant takes, as shown in FIG. 7B.

For example, according to the example of an event log shown in FIG. 7B, the host conference server 10 can extract information on the events of the respective participants, including that the user with user ID "012" connects the portable phone 51 to the host conference server 10, sends a message to the host conference server 10, and disconnects the connection, and that the user with user ID "005" displays a received message.

With the above, it can be determined that the equipment used by the user with user ID "012" is inferior to the participants using the convention servers 10, 30 as the user with user ID "012" uses a portable phone 51, and therefore that the disadvantageous degree of the user with user ID "012" is relatively larger. Moreover, as the user with user ID "012" participates in the conference via a network, their disadvantageous degree is believed to be relatively larger when communication quality is taken into consideration, compared to the participants using the host conference server 10.

As described above, the participant state extraction processor 15 can extract information on the state of attendance of each participant by analyzing the attendance state data collected by the state data acquisition processor 13 or the state data receiving unit 14.

In step 130, the disadvantageous degree calculation processor 20 of the disadvantageous degree information production processor 16 calculates a disadvantageous degree of each participant based on the information on the state of attendance of each participant, which is extracted by the participant state extraction processor 15.

Figure 8A:
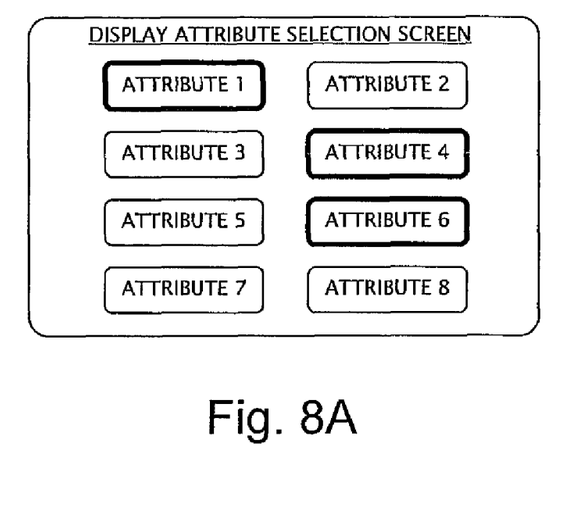
FIG. 8A is a diagram showing an example of a display attribute selection screen in which disadvantageous degree display information is shown in this exemplary embodiment.
Figure 8B:
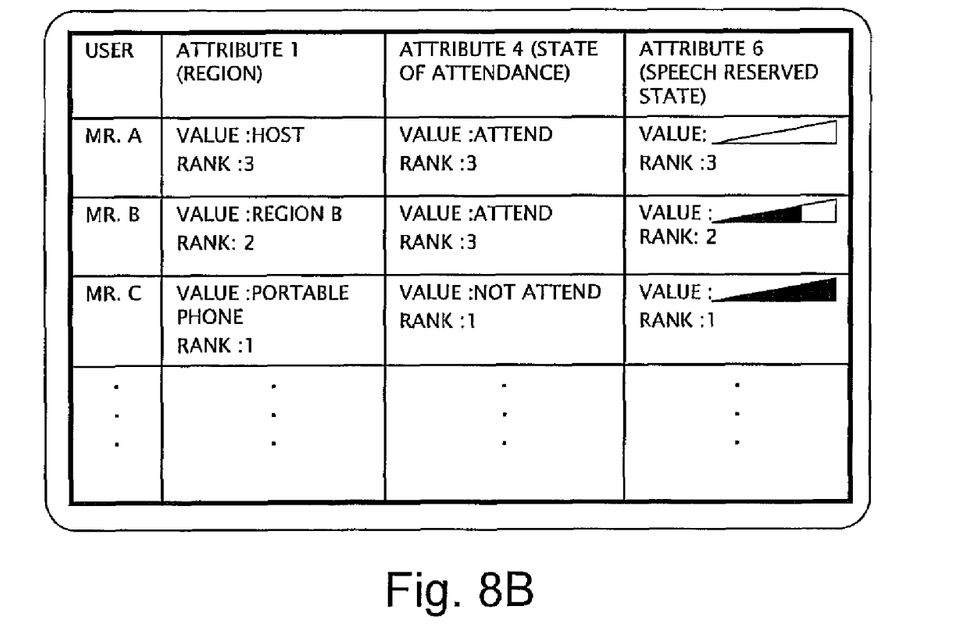
FIG. 8B is a diagram showing an example of displayed content when showing the disadvantageous degree display information on a screen in this exemplary embodiment.
Figure 9:
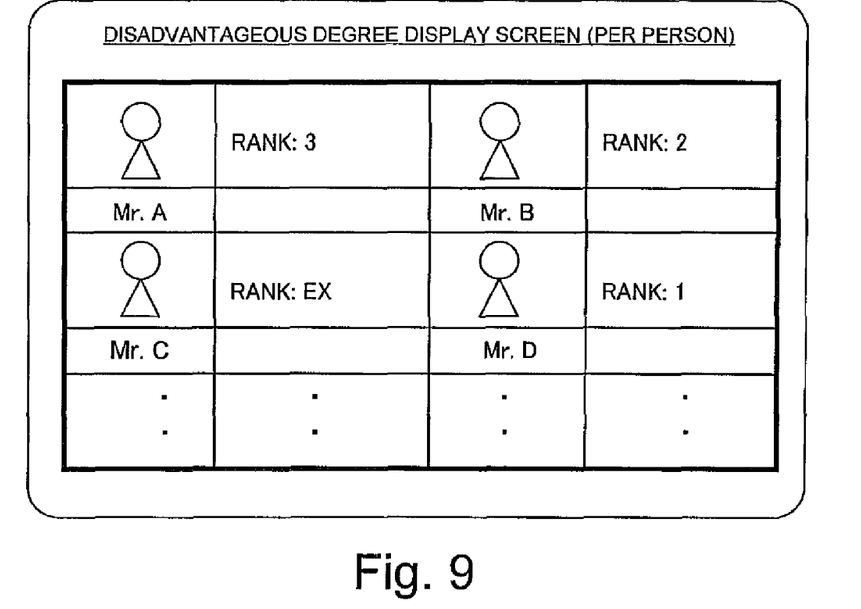
FIG. 9 is a diagram showing another example of displayed content when showing the disadvantageous degree display information on a screen in this exemplary embodiment.
Figure 10:
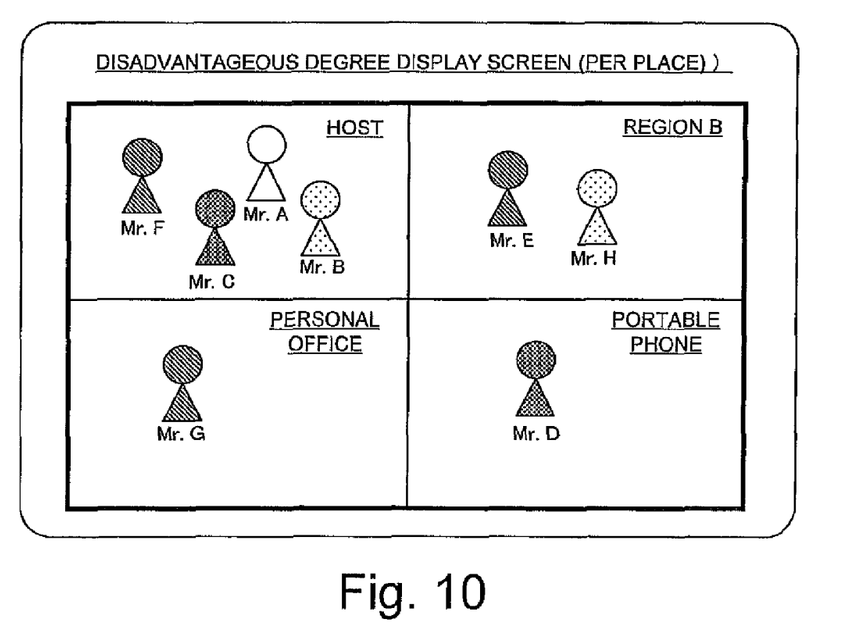
FIG. 10 is a diagram showing still another example of displayed content when showing the disadvantageous degree display information on a screen in this exemplary embodiment.

FIGS. 8 through 10 are diagrams showing examples of a screen image showing disadvantageous degree information produced by the disadvantageous degree information production processor 16 and displayed by the display controller 17. In the following, this exemplary screen image will be briefly described so as to aid comprehension of what type of index data a disadvantageous degree to be calculated is.

As described above, as a variety of attendance state data is collected by the state data acquisition processor 13 or the state data receiving unit 14, the participant state extraction processor 15 extracts plural information items on the state of attendance of each participant. That is, when it is defined here that each item indicative of a state of attendance is referred to as an "attribute", it can be said that plural attribute data items are obtained for each participant.

Specifically, in the example shown in FIG. 8A, the moderator selects the attributes 1, 4, 6 out of the plural attributes, and the values of the respective attributes selected are displayed for each participant. As for Mr. B, for example, it is known from FIG. 8B that the disadvantageous degree rank for attribute 1 is "2" as he is in "region B", that is, a place other than the main location, the disadvantageous degree rank for attribute 4 is "3" as he attends the conference, and the disadvantageous degree rank for attribute 6 is "2" as not a long period of time has yet passed since his last speech.

While FIGS. 8A and 8B show examples of a disadvantageous degree of each attribute, FIG. 9 shows an example of ranking of each participant.

That is, the attribute values can vary depending on the type of attributes such that, for example, the disadvantageous degree for the attribute 1 for a certain participant may be "1", one for the attribute 2 may be "3", and so forth. FIG. 9 shows an example in which the respective attribute values are rounded up so that each of the participants is ranked, and the ranking is displayed. FIG. 9 shows disadvantageous rankings of the respective participants, which are prepared in a table format, while FIG. 10 shows disadvantageous rankings of the respective participants who are grouped depending on a conference holding space.

As is obvious from the exemplary screen image displayed, the disadvantageous degree calculation processor 20 calculates disadvantageous degrees of the respective attributes of each participant based on the information on the state of attendance for every attribute of that participant, which is extracted by the participant state extraction processor 15. The disadvantageous degree calculation processor 20 further calculates a disadvantageous degree of that participant based on these attribute values. When the disadvantageous degrees are calculated, the ranking processor 21 ranks the respective attributes of each participant and also each participant.

Returning to step 130, the disadvantageous degree calculation processor 20 reads a disadvantageous degree calculation expression from the disadvantageous degree determination information holding unit 19, and substitutes the information on the state of attendance of each participant, which is extracted by the participant state extraction processor 15, into the disadvantageous degree calculation expression to thereby calculate the disadvantageous degrees of the respective attributes for every participant. As the state of attendance is expressed in a variety of forms such as numeric value data, a logical value, or the like, the disadvantageous degree calculation expression is defined by an expression according to the one or more attribute values to be substituted thereto. For example, the average, maximum, weighted average, logical sum, or logical product, may be obtained to calculate a disadvantageous degree of each attribute.

Further, the disadvantageous degree calculation processor 20 substitutes the disadvantageous degree of each attribute into a predetermined calculation expression to thereby calculate a disadvantageous degree of each participant. The disadvantageous degree calculation expression can be desirably modified on a customized screen.

In step 140, the ranking processor 21 reads a reference value for use in ranking of a disadvantageous degree from the disadvantageous degree determination information holding unit 19, and ranks each of the respective disadvantageous degrees based on the relative magnitudes of the reference value read and each of the disadvantageous degrees calculated by the disadvantageous degree calculation processor 20. In this exemplary embodiment, four ranks, namely, ranks one through three and the rank "ex" indicative of an object out of ranking, are available, in which the rank one is the rank corresponding to the group with the largest disadvantageous degree, with the larger number corresponding to a smaller disadvantageous degree.

In an example of a communication state, it is known that a participant with the rank one is connected to the host conference server 10 under the worst communication state, a participant with the rank three is connected to the host conference server 10 under a comfortable communication state, and a participant with the rank two is connected to the host conference server 10 under the communication state between those of ranks one and three. The rank ex refers to out-of-ranking as a communication line is not connected. Alternatively, the rank ex may be defined as rank one, with the ranks one through three redefined as ranks two through four, respectively. Ranking of the respective disadvantageous degrees based on the state of attendance is made based on the reference value as described above. The reference value can be set for every attribute, and desirably changed on a customized screen where a setting value is prepared in advance.

In the following, examples of a reference for calculation of a disadvantageous degree and ranking will be described.

"Conference Tool Environment"

This describes what kind of tool is used by a participant participating in a remote conference. For example, some participant may use a touch panel display device and a camera, a touch panel display device and audio, an audio conference system alone, a personal use PC and a web camera, a portable information terminal alone, or the like. Due to the difference in tools used, a difference in the degree of disadvantage will be caused in view of the amount of accessible information, the sense of presence, or the like. In addition, audio quality and the number of screens may affect the disadvantageous degree in view of information loss. As such, a portable information terminal or the like is ranked one, the combination of an audio conference system or a personal use PC and a web camera is ranked two, the combination of a touch panel display device and a camera and a combination of a touch panel display device and audio are ranked three, and so forth.

"Communication State"

This refers to the state of communication with a network, and is determined based on a value such as a communication loss rate or the like, as mentioned in the above. The state of disconnected communication is ranked as "ex".

"Participate, Not Participate"

This refers to whether or not a user participates in a conference, and is determined based on the presence or absence of data read from an IC card. Specifically, the state in which a user participates in a conference is ranked three, and the state in which a user does not participate in a conference is ranked "ex".

"Region from which User Participates in Conference"

This may include a host conference room, a remote conference room, a personal office, an outside place, or the like. Personal relationship, such as presence of a moderator, may be used as a determination criterion.

"Position of Participant in Conference"

This refers to a moderator, an executive, a person to make a decision, or the like.

"Distance from Touch Panel Display Device"

Being closer to the touch panel display device 11 is determined as contributing more to the conference as it is possible to write on the touch panel display device 11.

"Number of Participants in Conference Holding Space"

The lower number is determined as being a larger disadvantageous degree as the sense of alienation may be increased when only a few participants are present in the room, and they tend to contribute less to the conference.

"Opinion Reserved State"

This refers to a state in which a participant wishing to speak waits for a chance to speak or to press a predetermined speech button or the like, or to the period of time elapsed after their last speech. A higher disadvantageous degree rank is given to a person who does not speak though they wishes to speak or are expected to speak.

The opinion reserved state will be described more below.

In a remote meeting, it may be relatively difficult for a participant in a remote conference to obtain a chance to speak, compared to a participant in a host conference room. Then, a participant in a conference room 3 in a remote location writes a memorandum in the touch panel display 31 to request a change in order to inquire or speak, and sends the memorandum to the host conference server 10, so that the memorandum is shown in the touch panel display device 11. A participant in a personal office or an outside place where no touch panel display device is available sends an electronic mail to the host moderator by utilizing an electronic mail function.

When such a data transmission is included as an object to be monitored, it is possible to determine whether or not any conference participant is waiting for a chance to speak. Moreover, ranking can be made based on the period of time elapsed after the person comes to be in such an opinion reserved state.

In step 150, when the disadvantageous degree information production processor 16 ranks the respective attributes of the participants and the respective participants themselves to thereby produce disadvantageous degree information to be displayed, the display controller 17 shows on the screen the produced disadvantageous degree information designated through a predetermined user operation. For example, the sample menu shown in FIG. 8A is displayed in response to a predetermined button operation carried out on a menu screen (not shown) in order to refer to the disadvantageous degrees of the respective attributes, and an attribute to be referred to is selected from the submenu. As a result, the value and rank of the designated attribute are shown in the form of a list for each participant, as shown in FIG. 8B.

Also, when a predetermined button operation is carried out on a menu screen (not shown) in order to refer to a disadvantageous degree of each conference member, ranks of the respective conference participants are shown as shown in FIG. 9.

FIG. 10 shows an example of a screen image which is displayed such that the locations of the respective conference members can be ascertained. In FIG. 10, the design of each person is displayed in a different manner depending on the rank, so that the rank of each participant can be visibly recognized. In this exemplary embodiment, for the purpose of convenience, different patterns are used to display the respective persons, although any other display attributes, such as color, size, or the like, may be used to show people differently.

It should be noted here that although the information on the disadvantageous degree is displayed in the touch panel display device 11 in this embodiment, the information may alternatively be displayed in any display unit other than the touch panel display device 11. For example, the information may be displayed in a display (not shown) used personally by the moderator, for example. That is, a place where the information on a disadvantageous degree is displayed is not limited to the touch panel display device 11.

Also, although the information on the disadvantageous degree is displayed in response to a predetermined button operation in the above, the information may alternatively remain displayed in a part of a display or the touch panel display device 11 referred to by the moderator. With this arrangement, in the case where the attribute data on a speech reserved state is an object to remain displayed, for example, the moderator can instantly be aware of the fact that Mr. E's attribute relevant to a speech reserved state is upgraded to rank one as Mr. E sends an electronic mail asking for a chance to speak.

In this manner, the moderator can promptly respond to the request from Mr. E and offer an opportunity to speak. The output destination is not limited to a display unit such as a display, and the data may alternatively be output to an output unit such a printer or the like or an external memory device in which the data is stored in a file format.

In this exemplary embodiment, by collecting the information on the state of a network and/or the conference holding space, the state of attendance of the participant in the conference is known, and information on the disadvantageous degree of each participant is produced and displayed based on the state of attendance. With this arrangement, the moderator, while referring to the information, can give an appropriate instruction by encouraging a participant who does not speech to speak according to their state of attendance and/or by offering an opportunity to speak in response to a request from a participant who wishes to speak. This makes it possible to achieve fulfillment and smooth progression of the conference.

In this exemplary embodiment, it is basically possible to provide information which is appropriate for the moderator to preside over the conference. Alternatively, it may be possible to arrange so as to provide information on a disadvantageous degree to other locations.

Further, although the state data receiving unit 14, the participant state extraction processor 15, the disadvantageous degree information production processor 16, and the disadvantageous degree determination information holding unit 19 are provided to the host conference server 10 in this exemplary embodiment, these may alternatively be provided to another device which is personally used by a moderator, such as a PC or the like.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information terminal device in an electronic conference system, comprising:
   a reception unit that receives information on a state of attendance of participants in a conference, who are present in a plurality of conference holding spaces;
   a disadvantageous degree calculation processor that calculates a disadvantageous degree indicating a degree of disadvantage which each participant has when participating in the conference, based on the received information; and
   a disadvantageous degree output processor that outputs the calculated disadvantageous degree.

2. The information terminal device in an electronic conference system according to claim 1, wherein the disadvantageous degree output processor ranks the disadvantageous degree based on a reference value set in advance, to thereby distinctively output a rank of the disadvantageous degree.

3. The information terminal device in an electronic conference system according to claim 1, wherein the information which the reception unit receives includes at least one of,
   device installation state data concerning a state of installation of a device in each conference holding space,
   communication line quality data concerning quality of a communication line between the computer and the conference terminal device,
   captured image data on the conference holding space, which is captured using an image capturing unit installed in the conference holding space,
   participant ID code data read by a first sensor unit from a participant ID code memory carried by each participant,
   participant ID code. data and participant position specifying data read by a second sensor unit from the participant ID code memory carried by each participant,
   audio data collected by an audio input unit installed in each conference holding space, and
   input data input by the participant into the information terminal device.

4. A computer readable recording medium storing a program causing a computer to execute a process comprising:
   receiving information on a state of attendance of participants in a conference, who are present in a plurality of conference holding spaces;
   calculating a disadvantageous degree indicating a degree of disadvantage which each participant has when participating in the conference, based on the received information; and
   outputting the calculated disadvantageous degree.

5. The recording medium according to claim 4, wherein the disadvantageous degree is ranked based on a reference value set in advance, to thereby distinctively output a rank of the disadvantageous degree.

6. The recording medium according to claim 4, wherein the information on the state of attendance includes at least one of,
   device installation state data concerning a state of installation of a device in each conference holding space,
   communication line quality data concerning quality of a communication line between the computer and the conference terminal device,
   captured image data on the conference holding space, which is captured using an image capturing unit installed in the conference holding space,
   participant ID code data read by a first sensor unit from a participant ID code memory carried by each participant,
   participant ID code data and participant position specifying data read by a second sensor unit from the participant ID code memory carried by each participant,
   audio data collected by an audio input unit installed in each conference holding space, and
   input data input by the participant into the information terminal device.

7. An electronic conference assistance method carried out by a computer incorporated into an electronic conference system for assisting an electronic conference which takes place between one or more participants in a plurality of conference holding spaces by using an information terminal device having a communication function mounted thereto and installed in each of the conference holding spaces, the method comprising:
   receiving information on a state of attendance of participants in a conference, who are present in a plurality of conference holding spaces;
   calculating a disadvantageous degree indicating a degree of disadvantage which each participant has when participating in the conference, based on the received information; and
   outputting the calculated disadvantageous degree.

* * * * *